S. D. DEYO.
Corn-Planter.
No. 44,406. Patented Sept. 27, 1864.
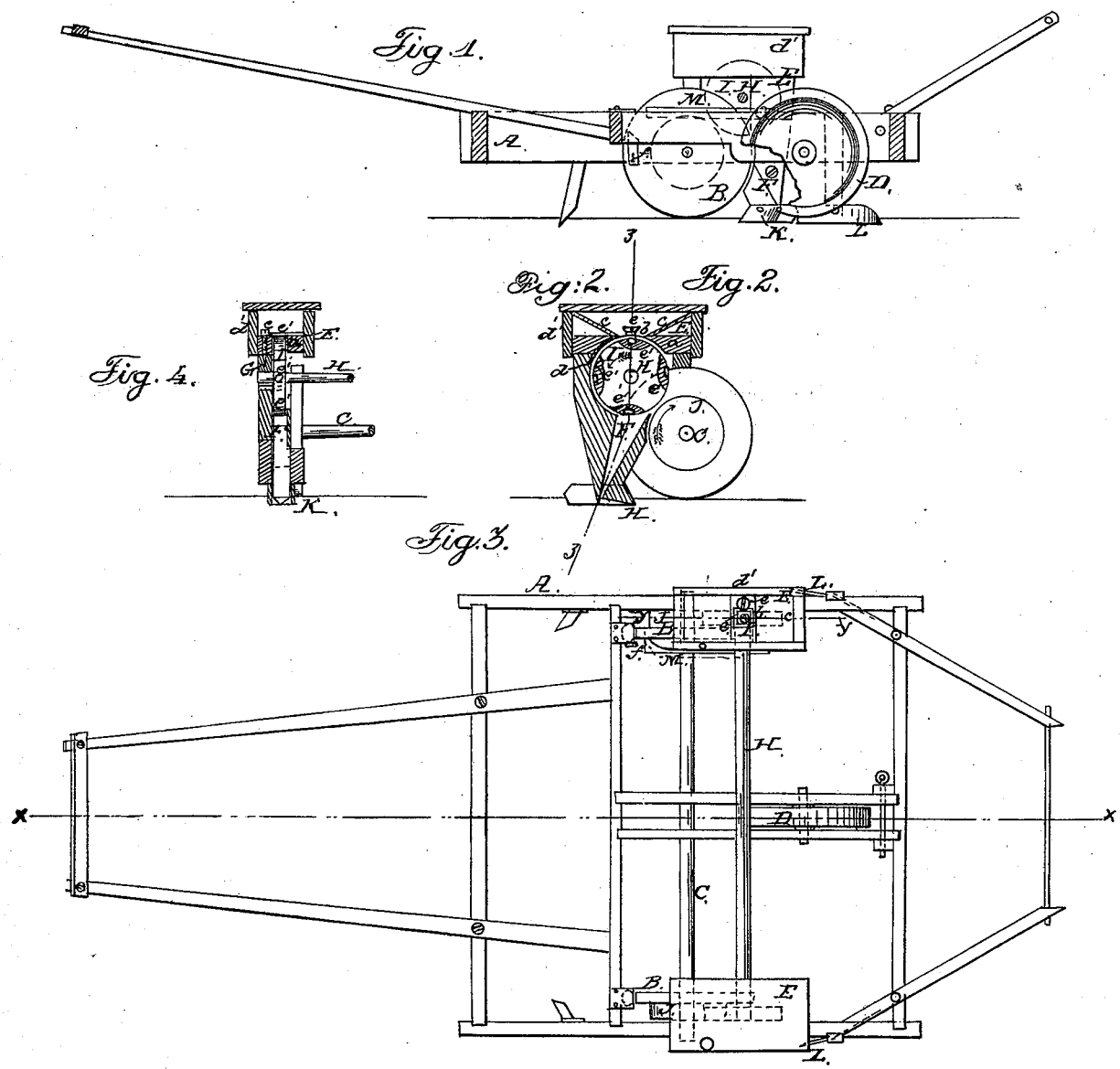

UNITED STATES PATENT OFFICE.

SAML. D. DEYO, OF STRAWBERRY POINT, IOWA.

IMPROVEMENT IN SEEDING-MACHINES.

Specification forming part of Letters Patent No. 44,406, dated September 27, 1864.

*To all whom it may concern:*

Be it known that I, SAMUEL D. DEYO, of Strawberry Point, in the county of Clayton and State of Iowa, have invented a new and Improved Seeding-Machine; and I do hereby declare that the following is a full, clear, and exact description of the same, reference being had to the accompanying drawings, making a part of this specification, in which—

Figure 1 is a side sectional view of my invention, taken in the line $x\,x$, Fig. 3; Fig. 2, a vertical section of a portion of the same, taken in the line $y\,y$, Fig. 3; Fig. 3, a plan or top view of the same; Fig. 4, a vertical section of Fig. 2, taken in the line $z\,z$.

Similar letters of reference indicate corresponding parts in the several figures.

This invention relates to a new and improved seeding-machine designed for planting seed either in drills or hills and in check-rows.

The invention consists in a novel arrangement of seed-distributing wheels, as hereinafter fully shown and described, whereby the same are operated or rotated directly from the traction-wheels of the machine, and a very simple and efficient device obtained.

The invention further consists in a seed-dropping alarm for insuring the dropping of the seed in check-rows or drills.

To enable those skilled in the art to fully understand and construct my invention, I will proceed to describe it.

A represents a rectangular frame, which is mounted upon two wheels, B B, attached permanently to an axle, C, which rotates in its bearings. D is a wheel, which is placed centrally in the back part of the frame A, and supports said part of the frame.

E E represent two seed-boxes, which are placed one at each side of the frame A, and terminate in discharge-spouts F at their lower ends. (See Fig. 3.) In the outer sides of the seed-boxes E E there are fitted slides G, (see Fig. 4,) one in each, and in these slides the journals of a shaft, H, are fitted, said shaft having two wheels, I I, upon it, which rotate one in each seed-box E, and form a division between the seed-boxes and the spouts F.

In each seed box there is placed a bottom, $a$, which is grooved at its under side to receive the upper parts of the wheels I I, and a hole, $b$, is made in each bottom $a$, directly over the center of the wheel, to admit of the seed coming in contact therewith, two inclined plates, $c\,c$, being placed in each hopper to direct the seed to the wheels, as shown clearly in Fig. 3.

To the under side of each bottom $a$ there is attached a curved plate, $d$, and these plates fit snugly to the peripheries of the wheels I I at their rear sides. The bottoms $a$ are firmly secured by screws or otherwise to the outer sides of the hoppers, and the wheels I I bear upon wheels J J, which are attached concentrically to the outer sides of the traction-wheels B B of the machine, and which cause, under sufficient pressure and friction, the wheels I to rotate as the machine is drawn along.

The upper parts, $d'$, of the seed-boxes E, in the lower parts of which the bottoms $a$ are secured, are made separate from the lower parts, and a screw, $e$, passes through each bottom $a$ and rests upon the tops of the slides G G. By turning these set-screws the pressure of the wheels I on the wheels J may be regulated, as required, to insure the rotation of the wheels I, as will be fully understood by referring to Fig. 4.

In the periphery of the wheels I there are made a series of holes, $e'$, to serve as seed-cells. Any number of these holes may be made, according to the kind of seed to be planted and the manner in which it is to be planted—that is to say, in hills or drills. A portion of them may be stopped or filled with wax or other suitable material when all are not required.

To the lower ends of the spouts F, furrow-shares K are attached, and directly behind them there are covering-shares L. As the machine is drawn along the wheels I are rotated in the direction indicated by the arrows 1, and the holes $e'$ receive the seed from the seed-boxes and discharge it into the spouts F, which conduct it into the furrows made by the shares K, the shares L covering the seed, the plates $d$ preventing the entrance of seed between the wheels I and bottoms $a$.

To the inner side of one of the seed-boxes there is attached a spring, M, which is acted upon at every revolution of the wheel B adjoining, by means of a projection, $f$, at the inner side of said wheel. This spring, by the noise made at each vibration, serves as a warning to indicate when a dropping of seed should be made, and if a dropping should not be made by the wheels I at the proper time the machine is stopped and the wheels I turned or adjusted by hand until they operate perfectly, the slides G being relieved of the pressure of the screws e, so that the wheels I may be easily turned on the wheels J. By this means the seed may be planted uniformly and with a certainty.

I do not claim the distributing-wheels I, for they have been previously used; but,

Having thus described my invention, what I claim as new, and desire to secure by Letters Patent, is—

The fitting of the journals of the shaft H of the seed-distributing wheels I I in slides G, placed in the outer sides of the seed-boxes, in combination with the wheels J on the inner sides of the traction-wheels B B and the screws e in the bottoms a of the upper parts, d', of the seed-boxes, all arranged substantially as and for the purpose herein set forth.

SAMUEL D. DEYO.

Witnesses:
CHANCY BEMIS,
C. P. DOW.